United States Patent Office 3,005,013
Patented Oct. 17, 1961

3,005,013
ORGANIC TERTIARY PHOSPHINES
Martin Grayson, Stamford, and Patricia A. Keough, Ridgefield, Conn., assignors to American Cyanamid Company, New York, N.Y., a corporation of Maine
No Drawing. Filed Oct. 30, 1958, Ser. No. 770,574
9 Claims. (Cl. 260—464)

This invention relates to organophosphorus compounds and to the preparation thereof. More particularly, the instant discovery concerns organic tertiary phosphines corresponding to the general formula $$(A)_{n-1}P(Z)_{4-n}$$

wherein P represents phosphorus; A is a beta-substituted ethyl functional moiety, including $$NC-CH_2-CH_2, \ R_2N-\overset{O}{\underset{\|}{C}}-CH_2-CH_2$$

and $$R'-O-\overset{O}{\underset{\|}{C}}-CH_2-CH_2$$

in which R is H or an alkyl group having 1 to 6 carbon atoms, and R' is an alkyl group having 1 to 6 carbon atoms, said β-substituted ethyl functional group being attached directly to P through its α-carbon atom; Z is a substituted and unsubstituted, branched and straight chain alkyl group; a substituted and unsubstituted, branched and straight chain alkenyl group; a substituted and unsubstituted cycloalkyl group; a substituted and unsubstituted cycloalkenyl group; said substituted alkyl and cyclic groups having their substituents on a carbon atom at least three carbon atoms removed from the phosphorus atom; and $n$ represents a value from 1 to 3.

According to the present invention, the tertiary phosphines contemplated herein are prepared by a process which comprises contacting a compound of the formula $$(A)_nP(Z)_{3-n}$$

in which A, P, Z and $n$ have the meanings given above, with a halogen-substituted compound having the formula ZX, wherein Z is the same as above and X is a halogen atom, including bromine, chlorine and iodine, to produce the corresponding quaternary phosphonium halide having the structure $$[(A)_nP(Z)_{3-n}Z]^+X^-$$

The quaternary phosphonium halide is reacted with a strong base, such as an alkali metal alkoxide, sodium cyanide, and sodium amide, and a product corresponding to the formula $$(A)_{n-1}P(Z)_{4-n}$$

is recovered. In all the formulae the symbols have the significance attributed to them hereinabove.

Reaction of the quaternary phosphonium halide with a strong base may be carried out in the presence of an inert organic solvent, such as an alcohol, liquid ammonia, and the like. For example, when a metal alkoxide, such as sodium methoxide, is used as the base, a solvent such as methanol may be used as a reaction medium. Likewise, liquid ammonia may be employed as the solvent when sodium amide, for example, is the base reactant.

A typical reaction according to the instant invention involves reacting tris(2-cyanoethyl)phosphine with methyl iodide to produce the corresponding quaternary phosphonium iodide having the formula $$[(CNCH_2CH_2)_3PCH_3]^+I^-$$

The thus-produced quaternary phosphonium iodide may then be reacted with sodium ethoxide to yield:

$$(CNCH_2CH_2)_2PCH_3 + NaI + CH_3-CH_2-O-CH_2-CH_2-CN$$

The molar ratio of ZX to $(A)_nP(Z)_{3-n}$ contemplated herein is at least 1, preferably slightly greater than 1, say, up to about 10. However, a ratio substantially greater than 10, on the order of 100 or more, may be used.

While an equimolar concentration of quaternary phosphonium halide and base reactant is suitable, it is by no means critical, since concentration ratios of 25:1 or more and 1:25 or less may be used with satisfactory results.

In general, reaction between a monohalogen-substituted compound and an organic tertiary phosphine, as contemplated herein, is carried out at a temperature in the range of about 0° C. to about 150° C., preferably 15° C. to 115° C. If desired, this reaction may be made to take place in the presence of an inert solvent, such as glacial acetic acid, an alcohol, acetonitrile, acetone, and the like, in which case the maximum practical temperature is preferably that of the reflux temperature of the solvent, as will be seen hereinafter.

With respect to the reaction between the intermediate quaternary phosphonium halide and the strong base, a reaction temperature in the range of about 5° C. to about 115° C. is employed, preferably 20° C. to 80° C.

Although reaction between a tertiary phosphine of the type contemplated herein having the formula $$(A)_nP(Z)_{3-n}$$

with a monohalogen-substituted compound having the formula ZX is generally carried out at atmospheric pressure, sub-atmospheric and super-atmospheric pressures are suitable. The same applies to the reaction between the quaternary phosphonium halide and the strong base.

The novel products of the present invention are useful in polymerization processes designed to give linear phosphorus-containing polymers with metal bonding and fire-retardant properties. For example, the product of Example I, above, may be combined with formaldehyde to yield the corresponding bis-nitrile formaldehyde polyamide, a water-soluble film. This film may be cross-linked with hexamethylol melamine to give a tough, clear hard film.

The completely unsymmetrical phosphines prepared according to the present invention, such as methyl, ethyl 2-cyanoethyl phosphine, in the form of their phosphine oxides, are capable of resolution into optically-active forms (dextro-and-levorotatory) which exhibit unusual physiological activity compared to the unresolved, racemic compound.

Among the strong bases contemplated for use herein are the metal alkoxides, such as sodium methoxide, potassium ethoxide, aluminum isopropoxide, and the like, and, as indicated above, sodium cyanide, sodium amide, and the like.

EXAMPLE I

*Methyl bis(2-cyanoethyl)phosphine*

$$CH_3P(CH_2CH_2CN)_2$$

Tris(2-cyanoethyl)phosphine (386.4 grams, 2.0 moles) is dissolved in five liters of warm (40° C.) glacial acetic acid. Approximately 670 grams (4.65 moles) of methyl iodide is added during a period of 5 minutes with provision for some external cooling to maintain a temperature of 40–45° C. Subsequently, the resulting reaction mixture is stored at room temperature (21° C.–23° C.) overnight. Solids thus produced are then removed from the mixture by filtration and dried to recover methyl tris-(2-cyanoethyl)phosphonium iodide having a melting point of 239° C.–240° C.

Sodium methoxide (70.5 grams, 1.31 moles) is dissolved in 750 milliliters of absolute methanol and the resulting solution added to a refluxing mixture of 438 grams (1.31 moles) of the methyl tris(2-cyanoethyl)-phosphonium iodide produced above in 750 milliliters of methanol. After two hours of refluxing at about 65° C. the methanol is stripped under vacuum (10 millimeters pressure and 50° C.) from the reaction mixture, 600 milliliters of water is added and the resulting mixture extracted with 300 milliliters of benzene in three substantially equal portions. The benzene extraction solution is then dried at 21° C–23° C. with magnesium sulfate and stripped under vacuum (0.25 millimeter pressure and 50° C.) to remove the benzene solvent and derivative 2-methoxypropionitrile having a boiling point less than about 27° C. at 0.25 millimeter pressure. The residual liquid methyl bis(2-cyanoethyl)phosphine distills at 159° C.–160° C. (0.35 millimeter pressure), weighs 116.5 grams, and has a refractive index of $n_D^{25}$ 1.5030. Analysis. Calculated for $C_7H_{11}N_2P$ is 20.09 percent P; 19.88 percent P is found.

EXAMPLE II

*Methyl ethyl 2-cyanoethyl phosphine*

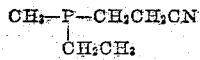

Methyl bis(2-cyanoethyl)phosphine (23.0 grams, 0.15 mole) produced as in Example I, above, is dissolved in 75 milliliters of absolute ethanol at room temperature (21° C–23° C), and 52 grams (0.33 mole) of ethyl iodide is added. The mixture is refluxed (about 80° C.) for 15 minutes, cooled to room temperature (21° C.–23° C.) and the resulting solid filtered therefrom and dried under vacuum (0.25 millimeter pressure, 21° C.– 23° C.). The product methyl ethyl bis(2-cyanoethyl)phosphonium iodide weighs 35.5 grams and has a melting point of 210° C.–211° C. Iodide analysis is 41.2 percent (calculated 40.9 percent).

Sodium metal (2.3 grams, 0.10 gram atom) is dissolved in 150 milliliters of absolute ethanol and 31.0 grams (0.10 mole) of methyl ethyl bis(2-cyanoethyl)phosphonium iodide (solid) is added thereto. The resulting mixture is heated to about 60° C. to dissolve the solid and the excess alcohol evaporated under vacuum conditions (10 millimeters pressure, 50° C.). A paste remains which is extracted with three equal 100-milliliter portions of benzene, thus leaving a benzene solution which is stripped of its benzene under vacuum (2.0 millimeters pressure, 25° C.) and distilled to yield 7.2 grams of product methyl ethyl 2-cyanoethyl phosphine having a boiling point of 68° C.–71° C. at 1.8 millimeters of mercury pressure and having a refractive index of $n_D^{25}$ 1.4688. Analysis. Calculated for $C_6H_{12}NP$ is 23.98 percent P and 23.62 percent P is found.

EXAMPLE III

*Allyl bis(2-cyanoethyl)phosphine*

$$CH_2=CHCH_2P(CH_2CH_2CN)_2$$

Tris(2-cyanoethyl)phosphine (145 grams, 0.75 mole) is dissolved in 750 milliliters of refluxing n-butanol and 168 grams (1.0 mole) of 3-iodopropene (allyl iodide) is added slowly to the refluxing material. The resulting mixture is refluxed at about 110° C. for an hour after addition is complete. After cooling slowly to room temperature (21° C.–23° C.) the solid found in the resulting reaction mixture is filtered and dried under vacuum, weighs 240 grams and has a melting point of 177° C.–178° C. and is identified as allyl tris(2-cyanoethyl)phosphonium iodide.

Sodium metal (4.6 grams, 0.20 mole) is dissolved in 150 milliliters of absolute ethanol and 69.4 grams (0.20 mole) of the allyl tris(2-cyanoethyl)phosphonium iodide produced above is added. The resulting mixture is heated to reflux, cooled to room temperature and the alcohol content thereof removed under vacuum. Water is then added to the mixture and the aqueous product extracted with chloroform. The chloroform extract is dried at room temperature with calcium sulfate and then the chloroform removed by vacuum stripping (50° C., 2 millimeters pressure) to yield 17.5 grams of liquid allyl bis(2-cyanoethyl)phosphine having a boiling point of 178° C.–179° C. at 1.65 millimeters pressure and a refractive index of $n_D^{25}$ 1.4980. Analysis. Calculated for $C_9H_{13}N_2P$ is C, 59.98 percent and H, 7.27 percent; and found is C, 59.53 percent and H, 7.75 percent.

EXAMPLE IV

*Cyclopentyl bis(2-cyanoethyl)phosphine*

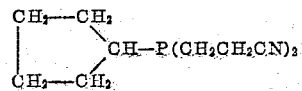

Tris(2-cyanoethyl)phosphine (48.3 grams, 0.25 mole) is dissolved in 250 milliliters of refluxing butanol and 37.2 grams (0.25 mole) of bromocyclopentane is added to the refluxing material. After refluxing overnight, the solution mixture is cooled to room temperature (21° C.–23° C.) and the resulting solid cyclopentyl tris(2-cyanoethyl)phosphonium bromide filtered and dried under vacuum (0.25 millimeter pressure, 21° C.–23° C.) yielding 79 grams of material having a melting point of 83° C.–84° C.

Sodium metal (4.6 grams, 0.2 gram atom) is dissolved in 100 milliliters of absolute ethanol and added to 68.4 grams (0.2 mole) of the cyclopentyl tris(2-cyanoethyl)-phosphonium bromide produced above in 100 milliliters of refluxing absolute ethanol. The alcohol is then stripped therefrom under vacuum, a small amount of water is added to the resulting material which is subsequently extracted with three 100-milliliter portions of chloroform. Next, water is removed from the extraction by drying with calcium sulfate at 21° C.–23° C. and the chloroform is removed under vacuum, leaving 12.5 grams of liquid cyclopentyl bis(2-cyanoethyl)phosphine having a boiling point of 165° C.–169° C. and a refractive index of $n_D^{25}$ 1.4962. Calculated for $$C_{11}H_{17}N_2P$$

is P, 14.54 percent; and found is P, 14.68 percent.

EXAMPLE V

*Dodecyl bis(2-carbethoxyethyl)phosphine*

$$CH_3(CH_2)_{10}CH_2P(CH_2CH_2CO_2CH_2CH_3)_2$$

Tris(2-carbethoxyethyl)phosphine (66.8 grams, 0.20 mole) is reacted with 54 grams (0.20 mole) of 1-iodododecane to give the phosphonium salt, dodecyl tris(2-carbethoxyethyl)phosphonium iodide. The phosphonium salt (109 grams, 0.18 mole) thus produced is reacted as in previous examples with 4.15 grams (0.18 gram atom) of sodium metal in absolute ethanol to give product dodecyl bis(2-carbethoxyethyl)phosphine.

EXAMPLE VI

*3-Methyl butyl bis(2-diethylcarbamoylethyl)phosphine*

$(CH_3)_2CHCH_2CH_2P[CH_2CH_2CON(CH_2CH_3)_2]_2$

Tris(2-diethylcarbamoylethyl)phosphine (41.5 grams, 0.10 mole) is reacted with 19.8 grams (0.10 mole) of 1-iodo-3-methylbutane to give the phosphonium salt. The resulting phosphonium salt (55 grams, 0.18 mole) is reacted with 4.15 grams (0.18 gram atom) of sodium metal in absolute ethanol to give 3-methyl butyl bis(2-diethylcarbamoylethyl)phosphine which is recovered.

EXAMPLE VII

*Methyl ethyl n-propylphosphine*

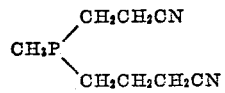

Methyl ethyl 2-cyanoethyl phosphine prepared as in Example II, above, (11.8 grams, 0.10 mole) is dissolved in 75 milliliters of absolute ethanol at room temperature under nitrogen, and 25.5 grams (0.15 mole) of n-propyl iodide is added. After 15 minutes of reflux, the solution is cooled, the solid filtered and dried. The resulting methyl ethyl n-propyl 2-cyanoethyl phosphonium iodide (26 grams, 0.09 mole) is added to 2.1 grams (0.09 gram atom) of sodium metal dissolved in 150 milliliters of absolute ethanol. After refluxing for 15 minutes the reaction mixture is stripped of ethanol by heating at reduced pressure and the product methyl ethyl n-propyl phosphine is extracted and recovered by distillation in the usual manner.

EXAMPLE VIII

*Methyl 2-cyanoethyl 3-cyanopropyl phosphine*

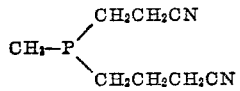

Methyl bis(2-cyanoethyl)phosphine prepared as in Example I, above, (196.5 grams, 1.27 moles) is dissolved in 350 milliliters of normal butyl alcohol at 50° C. under a nitrogen atmosphere, and 220.0 grams (1.49 moles) of 3-bromobutyronitrile is added in 30 minutes at 115° C. or the reflux temperature of the solvent. The reaction temperature is quickly reached by means of the vigorous exothermic nature of the reaction. The reaction is continued overnight at 110° C. by application of external heat. Upon cooling a solid forms which is dried and weighs 378.5 grams. Analysis for bromide is 26.10 percent; calculated theoretical value is 26.44 percent.

A solution of 27.6 grams (1.20 gram atoms) of sodium metal in 750 milliliters of absolute ethanol is dropped over a period of 30 minutes into a refluxing, stirred slurry of 362.7 grams (1.20 moles) of methyl bis(2-cyanoethyl) 3-cyanopropylphosphonium bromide in 500 milliliters of absolute ethanol under a nitrogen atmosphere. After an additional 30 minutes of refluxing, the solution is cooled and filtered to remove sodium bromide. After concentration by warming and pumping at 10 millimeter pressure, the residual liquid is filtered and distilled at 1.5 millimeter pressure. The product has a boiling point of 175° C. and a refractive index of $n_D^{25}$ 1.4995. Analysis calculated for carbon is 57.13 percent; hydrogen 7.79 percent. Analysis found for carbon is 57.25 percent; hydrogen 7.79 percent.

Unless otherwise indicated, the parts (percentages) specified hereinabove are by weight.

Typical of the halides contemplated herein represented by ZX, other than those mentioned above, are the halides of isobutyl, 3-methyl, 1-butyl, 2-butyl, 2-cyclohexylethyl, 2-octyl, 2-pentyl, 2-propyl, and the like.

Other typical alicyclic groups represented by Z in the formula $(A)_nP(Z)_{3-n}$ are cyclohexyl, 1-decalyl, 4-methylcyclohexyl, 3-paramenthyl, 2-cyclohexenyl, 3-cyclohexenyl, 3-cyclopentenyl, 2-cyclododecenyl, and the like.

Among other substituents for the alkyl, alkenyl, cycloalkyl, and cycloalkenyl groups represented by Z in the formula $(A)_nP(Z)_{3-n}$ said substituents being present on a carbon atom at least 3 barbon atoms removed from the phosphorus atom, are phenyl, dialkylamino, nitro, carboxyalkyl (ester), dialkylcarbamoyl, carbamoyl, alkyl or aryl ether or thioether, acetal, keto, fluoro, chloro, hydroxyl, and the like.

While the present invention has been described in detail with respect to specific embodiments thereof, it is not intended that these details imposed unnecessary limitations upon the scope of the invention, except insofar as these limitations appear in the appended claims.

We claim:

1. A process which comprises (a) reacting a compound of the formula $(A)_nP(Z)_{3-n}$ with a halogen-substituted compound having the formula ZX to produce the corresponding quaternary phosphonium halide having the structure $[(A)_nP(Z)_{3-n}Z]^+X^-$ (b) reacting the quaternary phosphonium halide thus produced with a strong base, and (c) recovering a product corresponding to the formula $(A)_{n-1}P(Z)_{4-n}$ P in the above formulae representing phosphorus; A representing a beta-substituted ethyl functional moiety selected from the group consisting of $$NC-CH_2-CH_2, R_2N-\overset{O}{\overset{\|}{C}}-CH_2-CH_2$$

and $$R'-O-\overset{O}{\overset{\|}{C}}-CH_2-CH_2$$

in which R is a member selected from the group consisting of H and an alkyl group having 1 to 6 carbon atoms and R' is an alkyl group having 1 to 6 carbon atoms; said beta-substituted ethyl functional group being attached directly to P through its alpha-carbon; Z representing a member selected from the group consisting of a substituted and unsubstituted, branched and straight chain alkyl; a substituted and unsubstituted, branched and straight chain alkenyl group; a substituted and unsubstituted cycloalkyl group; a substituted and unsubstituted cycloalkenyl; said substituted alkyl, alkenyl, cycloalkyl, and cycloalkenyl groups having their substituents on a carbon atom at least three carbon atoms removed from the phosphorus atom and said substituents for the alkyl, alkenyl, cycloalkyl, and cycloalkenyl groups being selected from the group consisting of fluoro, chloro, phenyl, dialkylamino, nitro, carboxyalkyl, dialkylcarbamoyl, alkyl ether, alkyl thioether, aryl thioether, acetal, keto and hydroxyl; X representing a halogen atom; and $n$ representing a value from 1 to 3.

2. The process of claim 1 wherein $(A)_nP(Z)_{3-n}$ is tris(2-cyanoethyl)phosphine, ZX is methyl iodide, and the product recovered methyl bis(2-cyanoethyl)phosphine.

3. The process of claim 1 wherein $$(A)_nP(Z)_{3-n}$$

is methyl bis(2-cyanoethyl)phosphine, ZX is ethyl iodide, and the product recovered is methyl ethyl 2-cyanoethyl phosphine.

4. The process of claim 1 wherein $$(A)_nP(Z)_{3-n}$$

is tris(2-cyanoethyl)phosphine, ZX is allyl iodide, and the product recovered is allyl bis(2-cyanoethyl)phosphine.

5. The process of claim 1 wherein $$(A)_nP(Z)_{3-n}$$

is tris(2-carbethoxyethyl)posphine, ZX is 1-iodododecane, and the product recovered is dodecyl bis(2-carbethoxyethyl)phosphine.

6. The process of claim 1 wherein $$(A)_nP(Z)_{3-n}$$

is tris(2-cyanoethyl)phosphine, ZX is bromocyclopentane, and the product recovered is cyclopentyl bis(2-cyanoethyl)phosphine.

7. The process of claim 1 wherein $$(A)_nP(Z)_{3-n}$$

is reacted with ZX in the presence of an inert organic solvent and the resulting quaternary phosphonium salt, in turn, is reacted with a strong base in the presence of an inert organic solvent.

8. The process of claim 1 wherein the strong base is a member of the group consisting of metal alkoxide, sodium cyanide and sodium amide.

9. The process of claim 1 wherein the strong base is an alkali metal alkoxide.

No references cited.

UNITED STATES PATENT OFFICE
CERTIFICATE OF CORRECTION

Patent No. 3,005,013                      October 17, 1961

Martin Grayson et al.

It is hereby certified that error appears in the above numbered patent requiring correction and that the said Letters Patent should read as corrected below.

Column 5, lines 20 to 23, the formula should appear as shown below instead of as in the patent:

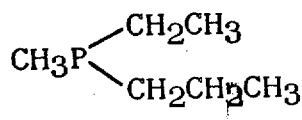

Signed and sealed this 1st day of May 1962.

(SEAL)
Attest:

ERNEST W. SWIDER
Attesting Officer

DAVID L. LADD
Commissioner of Patents